3,098,746
PROCESS OF PREPARING A COMPRESSED CHOCOLATE CHIP PRODUCT AND THE RESULTING PRODUCT
Peter P. Noznick, 2730 Thayer St., Evanston, Ill.; Charles W. Tatter, 18433 Martin Ave., Homewood, Ill.; and Carl F. Obenauf, 3005 Longfellow, Hazel Crest, Ill.
No Drawing. Filed Sept. 2, 1960, Ser. No. 53,631
7 Claims. (Cl. 99—23)

This invention relates to improved chocolate and cocoa products having the unique feature of remaining solid at elevated temperatures and of being relatively insoluble in water, in milk, and in usual vegetable and animal shortening fats.

The products of this invention have substantial value in the making of cookies and other bakery and ice cream confections of the so-called "chip" variety. In presently prepared cookie mixes, for example, the usual chocolate chips have an objectionable low softening point and, in addition, dissolve in the usual shortening so that when the mix is finally used, instead of a cookie having discrete chocolate chips distributed throughout its body, the cookies have a distinctive chocolate or cocoa flavor due to the uncontrolled dispersion of the chip composition. Thus, often, instead of a chip cookie, there is formed a chocolate cookie.

The present invention will avoid this difficulty, and the chips, whether packaged with other mix ingredients in a prepared baking mix, or kept as an individual ingredient to be added to a batter or dry mix, as desired, do not deteriorate in texture, hardness and ability to resist solution in water, milk, vegetable or animal fat, or cocoa fat. Also, where incorporated in a prepared mix, the chip resists the objectionable tendency of the conventional chip to be partially absorbed, as well as dissolved, by other ingredients present, such as the usual shortening fat.

The chips of this invention, as distinguished from conventional soft and oily chips, which soften and melt at about 95° to 100° F., not only remain stable in storage and under conditions of elevated temperature, e.g., 115° to 165° F., frequently encountered in cars, warehouses, docks and shelves of grocery stores, etc., but also of equal importance, during the baking or cooking operation, exhibit the desirable effect of swelling or expanding, and further have a decided chewy character, which is quite desirable.

An important feature of the improved products of this invention is that wherever the chips melt and soften under the high cooking or baking temperatures, e.g. above 200° F., as soon as the bakery articles or confections cool, the chips regel and are firm and hard, which has not been the case heretofore.

Cocoa or chocolate liquor may be used in this invention, which is operable with products having varying amounts of cocoa fat. The important difference in this invention is that the cocoa fat and milk fat are bound, i.e. constitute a core, which is encased in or protected by a substantially completely surrounding hull of milk serum solids not fat and non-fat chocolate solids and sugar where the latter is employed. This is not true of the usual chocolate chip products which allow the cocoa fat and milk fat to be absorbed and dissolved by contact with other ingredients of a prepared baking mix, for example, such as the shortening fats present due to the lack of a protective barrier or hull, as above described, which hull is present in the invention.

The following examples illustrate the manner of carrying out the invention.

Example 1

Ordinary sweet milk chocolate is melted down at a temperature of about 140° to 145° F. About 40% by weight of the melted chocolate is withdrawn and added to water having a temperature of 160° F. to produce about a 40% solids mixture which is then homogenized at about 140° to 145° F. and at about 1500 p.s.i. and thereafter spray dried to form a dry powder. This powder has a core of milk fat and cocoa fat encased in the cocoa, milk and sugar solids of the chocolate.

The powder is then added to the remaining melted chocolate (60% by weight) and dispersed thoroughly therein whereupon the mass is held at the fat crystallization point, usually 84° to 88° F. for 3 to 5 hours, preferably 86° F. for 4 hours. This allows the fat to crystallize slowly into very fine crystals. After this tempering, the mass is quick-chilled in a few minutes to about 75° F. and thereafter at this chilled temperature, the mass is then rolled into sheets and further chilled after rolling, e.g., to a temperature of 40° F. or a temperature below about 60° F. sufficient to harden and solidify the product, which may be subsequently broken up to produce the chips of this invention. Between about 60° and 75° F., the product is in a firm semi-hard state.

In this product the amount of molten chocolate which was withdrawn and treated and returned as the powder to the main body of melted chocolate was in a ratio of about .6 part powder to 1.00 part of molten chocolate. A ratio of .5 part treated powder to 1 part molten sweet chocolate by weight is about the lowest ratio which can be successfully used to obtain a final hard chip product which will resist softening and flowing or dissolving out under the usual conditions of use described above. When more than .5 part of the homogenized spray dried product is employed per part of melted chocolate, these desirable properties are proportionately more pronounced and beneficial.

The method just described is operated in the same manner where the original milk chocolate is unsweetened.

Example 2

A powdered sweet milk chocolate is prepared having substantially the same formula as the sweet milk chocolate in which it is to be incorporated by mixing chocolate liquor,[1] usually in semi-plastic form, milk to provide butterfat and non-fat milk solids, using extra butterfat or serum solids to give the desired adjusted content, and diluting to 40% solids with water. The mixture having a temperature of about 145° to 150° F. is then homogenized at about 1500 p.s.i. (1000 to 2000 p.s.i. being useful), and spray dried and cooled to room temperature. Then corn sugar (or cane or dextrose, or a mixture of two or more of these sugars are used successfully in similar examples) is added to the powder, which has been cooled to room temperature, and thoroughly mixed therewith, whereby the composition of this powder is substantially identical with that of the melted sweet milk chocolate in which it is now incorporated, as in Example 1. The process is otherwise the same as Example 1, and the

[1] In another example, cocoa powder was used instead of the chocolate liquor and in a further example, a mixture of the two was used.

chips obtained have a core of cocoa and milk fat substantially completely encased in milk serum and cocoa solids and the sugar.

The ratio of powder added to the melted chocolate was .75 part powder to 1 part melted chocolate.

An unsweetened product is prepared in the same manner, leaving out sweetening in the original chocolate and from the powder.

*Example 3*

Chocolate liquor (53.4%) and cane sugar (46.6%) were melted and mixed together, diluted with water to about 40% solids, homogenized, and the mixture spray dried as powder A.

Butterfat (29.4%) and milk solids non-fat (70.6%) diluted to about 40% solids with water were also melted together, homogenized, and spray dried as powder B.

69% by weight of powder A and 20% by weight of powder B were mixed together with 11% corn sugar syrup solids as additional sugar, to produce the final sweet milk chocolate powder mix.

This composition was then compressed at about 4000 p.s.i. or more into relatively hard tablets or other shapes, such as chips. In this product the cocoa fat is likewise bound by the cocoa and sugar solids hull in the case of powder A and the milk fat is similarly bound by the serum solids hull in the case of powder B. The added sugar and the fat which is extruded from the hull under compression form a satisfactory bond for the powder so that the discs, pellets, or other shapes, or chips, do not break or crumble.

*Example 4*

In this example the procedure is like either Examples 1, 2 or 3 with the exception that the cocoa or chocolate liquor which is incorporated in the melted chocolate or compressed with the milk fat and solids is prepared as follows:

300 pounds cocoa powder is added to 765 pounds of water heated to 120° F., and mixed. The mixture is then heated to 150° F., whereupon 6 pounds of starch liquefying fungal amylase, such as "Rhozyme," previously prepared as a slurry in 1 gallon of hot (130° F.) water, is added and the mixture agitated, whereupon the temperature of the mixture is increased to 170° F. and the mixture allowed to digest at 170° F. for 30 minutes until the starch has been liquefied. (Where deactivation of the enzyme is desired, the mixture is heated to 190° to 195° F. and held for 30 minutes.) Thereupon, cane sugar in amount of 150 pounds, and concentrated skimmilk having a total solids content of 30% in amount of 166 pounds, is added, and the temperature of the total mixture adjusted to 150° F. The mixture is homogenized in two stages with 1500 p.s.i. applied at the first stage, and 1000 p.s.i. applied at the second stage. The homogenized mixture is spray dried to produce a dry powder. In this powder, the cocoa fat is not only encased in cocoa solids, but in the milk solids and sugar solids, as well.

The pH of the mixture in the above example will vary between 6.0 and 7.0. The enzyme below 150° F. exhibits an objectionable proteolytic activity which destroys flavor, while above about 150° F. the enzyme exhibits its desirable liquefying action which becomes more effective as the temperature rises, until a temperature below about 190° F. is reached. A good temperature is about 158° F. Above 190° F., i.e. 190° to 195° F., the enzyme is destroyed, and this may be availed of after the digestion has proceeded sufficiently, in order to deactivate the enzyme.

The action of the enzyme is to break down the starch in the cocoa into dextrose and free sugars, and the action of the enzyme also renders the cocoa more fluid and soluble, so that the mixture is easier to homogenize and spray dry. In this connection also, the cocoa powder is more soluble in water than conventional "whip" solutions or dispersions, and thus has a higher flavor potency per gram or unit.

In the above example, proportions are not critical except that there should be enough sugar solids and milk serum solids present to protectively coat the cocoa fat whereby the powder consists of particles which comprise a cocoa fat core and a solids hull containing cocoa solids, non-fat milk solids, and sugar solids. The non-fat milk solids assure the desired protective coating of the fat core while the sugar solids coating, in addition, enhances solubility of the powder. In some cases, as where it may not be desired, the sugar can be omitted.

While the invention has been described in connection with cocoa, a low fat chocolate, it is equally effective with high fat chocolate, such as chocolate liquors. The term "cocoa" in the claims, therefore, is intended to include both chocolate liquors and cocoas containing varying amounts of fat, and also those which have been digested with an amylytic enzyme, as described above.

While we have referred to skimmilk in making the enzyme digested cocoa, whole milk may be used in substantially equal amount. In this event, the core will include milk fat as well as cocoa fat, protected by a hull of milk and cocoa solids, and, in most cases, also sugar solids which are, of course, preferably used.

Where the treated cocoa or chocolate liquor, as described in Examples 1, 2 and 4 is incorporated in the melted sweet chocolate, the ratio may vary from about .5 part of the treated product to 1 part of the melted chocolate up to equal parts and even greater. The more of the treated product used, the higher the softening point produced in the sweet chocolate mixture or resulting produced chip.

Where the incorporated treated powder greatly exceeds the melted chocolate, the product lends itself better to compression to form the final product as distinguished from extrusion in the case where the treated powder is in lesser amount than the melted chocolate in which it is incorporated.

In each of Examples 1, 2 and 4, ratios of about .5 to 1 up to 1.75 to 1 of treated product of powder to melted product in which the powder was incorporated were successfully used. In these examples, the step of extrusion was used to form the chip, but the ratio applies equally well where compression is used as in Example 3.

The final products do not melt or soften appreciably at temperatures of about 120° F. or above, and in many cases merely soften at about 200° F. to 250° F. In brief, the new products retain their identity and hardness through the usual temperatures encountered in grocery stores, drug stores, warehouses, trucks, freight cars, shipholds, and docks.

As stated above, the primary object of this invention is to provide a chocolate chip which will not diffuse in a cookie mix containing chocolate chip and from the foregoing it will be clear that one serious limitation of a conventional chocolate cookie mix is that the chocolate chip "spreads" or "melts" into the mix. The high fat level of the mix acts as a solvent for the chocolate and dissolves and absorbs the fat in the chocolate, producing a coalesced fat mass.

The examples above recited disclose various methods of overcoming this problem.

Enlarging upon the disclosure in Example 3, as a further example:

*Example 5*

A sweet milk chocolate is desired containing 25 to 26% fat and has the formula as follows:

| Ingredient | | Fat | Non-Fat |
|---|---|---|---|
| | Percent | Percent | Percent |
| Chocolate liquor (54% fat) | 16 | 8.64 | 7.36 |
| Cocoa fat | 12 | 12.00 | |
| Whole milk powder (28% fat) | 17 | 4.76 | 11.52 |
| Sugar | 55 | | 55.00 |
| Total | 100 | 25.40 | 73.88 |

Example 5a

| Ingredient | | Fat | Non-Fat |
|---|---|---|---|
| | Percent | Percent | Percent |
| Chocolate liquor (54% fat) | 16 | 8.64 | 7.36 |
| Cocoa fat | 12 | 12 | |
| Butter fat | 1 | 1.0 | |
| Whole milk powder (28% fat) | 16 | 4.48 | 11.52 |
| Sugar | 55 | | 55.00 |
| Total | 100 | 26.12 | 73.88 |

All the free cocoa fat and whole milk, including its butterfat, were spray dried together according to the formula containing 41.4% cocoa fat, 18.9% butterfat, 39.7% non-fat milk solids, and constitutes a "cocoa fat powder A."

In preparing the milk chocolate coating, 16 pounds of melted milk chocolate liquor are added to 55 pounds of sugar and the resulting mixture blended on a conventional powder blender or mixer into a smooth powder. To the warm mixture of chocolate-sugar (100° F.), 29 pounds of the above-described "cocoa fat powder A" are then intimately mixed in a powder blender or mixer, and the entire mixture is then compressed at about 4000 p.s.i. The resulting "cake" formed will be noticeably free of any "free" fat; will be dry to the touch; and because the bulk of the fat is surrounded by a non-fat coating material, namely cocoa and milk solids, will be relatively impervious to fat soakage, such as that in a high fat cookie mix.

Example 6

As an alternative to Example 5 given above, cocoa powder containing 10 to 22% fat is used with sufficient "free" cocoa fat added to make the total cocoa fat equivalent to that contributed by the chocolate liquor. Thus, if 16 pounds of chocolate liquor (54% cocoa fat) are used, 9.43 pounds of breakfast cocoa (22% fat), along with 6.57 pounds of cocoa fat, may be substituted. To facilitate ease of handling, the additional cocoa is preferably spray dried along with the original cocoa fat, and whole milk used in Example 5. Thus, Example 6 is as follows:

| Ingredient | | Fat | Non-Fat |
|---|---|---|---|
| | Percent | Percent | Percent |
| Breakfast cocoa | 9.43 | 2.07 | 7.36 |
| Cocoa fat | 19.57 | 19.57 | |
| Whole milk solids (28% fat) | 16.00 | 4.48 | 11.52 |
| Sugar | 55.00 | | 55.00 |
| Total | 100.00 | 26.12 | 73.88 |

Example 6a

| Ingredient | | Fat | Non-Fat |
|---|---|---|---|
| | Percent | Percent | Percent |
| Breakfast cocoa | 9.43 | 2.07 | 7.36 |
| Cocoa fat | 18.57 | 18.57 | |
| Butterfat | 1.00 | 1.00 | |
| Whole milk solids (28% fat) | 16.00 | 4.48 | 11.52 |
| Sugar | 55.00 | | 55.00 |
| Total | 100.00 | 26.12 | 73.88 |

All cocoa fat and whole milk, including added butterfat, as in Example 6a, are spray dried together in the ratio of 19.57% parts cocoa fat, 4.48 parts butterfat, and 11.52 parts skim solids, shown in Example 6. The formula for Example 6 is 54.9% cocoa fat, 12.57% butterfat, and 32.43% non-fat skim solids, and for Example 6a it is 52.2% cocoa fat, 15.27% butterfat and 32.43% skim solids.

In preparing the mixture to be compressed, add 9.43 pounds of breakfast cocoa (22% fat), 35.57 pounds of powder prepared as in Examples 6 and 6a, and 55 pounds of sugar. The mixture is intimately mixed and then compressed at 4000 p.s.i.

Example 7

Referring to Examples 1, 2 and 4, the melted chocolate and the powder produced were each chocolate liquor.

Example 8

In this example, the process of Examples 1, 2 and 4 were carried out with the melted chocolate as chocolate liquor, and the powder as cocoa and cocoa fat.

Example 9

This example was like Examples 7 and 8 except that the melted chocolate was cocoa and cocoa fat and the powder was cocoa and cocoa fat.

Example 10

This example was like Example 9 except that the melted chocolate was cocoa and cocoa fat and the powder was formed of chocolate liquor.

Example 11

In this example chocolate liquor in combination with cocoa or cocoa fat or cocoa and cocoa fat was substituted in each of the foregoing examples to replace the chocolate liquor, cocoa, cocoa fat or cocoa and cocoa fat, and notably, Examples 7 to 10.

Example 12

Here, enzymatically treated chocolate liquor and cocoa products prepared as described above were used in each of the foregoing examples to replace either the chocolate liquor, or the cocoa or the cocoa fat or the combination of any two or three thereof, notably, in Examples 7 to 11.

The products described herein all meet the legal standards for chocolate and chocolate chip, but, as pointed out, do not objectionably soften or melt as in a cookie mix at high temperatures, e.g. about 115° to 250° F., nor are the chips absorbed into the mix at high temperatures. This temperature range comprehends the temperatures from those normally encountered in storage and handling up to and including the baking temperatures of cookie and pastry mixes.

Referring to Example 1 and related examples, it will be appreciated that a powder is formed for inclusion with the melted milk chocolate (sweet or unsweet), which powder may be regarded as a shortening including cocoa and cocoa fat. That is, the powder comprises a fat core of milk fat, and cocoa fat, all fats being encased in a hull of milk solids, cocoa solids, and, where sugar is added, with the sugar encasing solids, as in the foregoing examples. In some cases, conventional vegetable or even animal fats or a mixture of the same are used along with milk fat and cocoa fat. All of the products of this invention consist of discrete units or islands of cocoa fat which are prevented from coalescing together or with other fats by reason of the protective hull around each cocoa fat and other fat globule, such as milk fat or shortening fat contained within the compressed chocolate mix or in the chocolate mix in which treated powder is incorporated, as in Example 1.

The following are examples of conventional cookie mixes in which the chocolate chips of this invention are incorporated:

Example 13

| | Percent |
|---|---|
| Wheat flour | 39.3 |
| Sugar | 26.0 |
| Powdered shortening | 10.0 |
| Plastic shortening | 20.0 |
| Egg yolk powder | [1] .8 |
| Soda bicarbonate | [1] .8 |
| Sodium acid pyrophosphate | [1] .2 |
| Mono-calcium phosphate | [1] .2 |
| Salt | 1.0 |
| Wheat starch | 1.7 |

[1] Leavener.

Example 14

| | Percent |
|---|---|
| Wheat flour | 39.3 |
| Sugar | 26.45 |
| Plastic shortening | 27.3 |
| Soda bicarbonate | .8 |
| Sodium acid pyrophosphate | .2 |
| Egg yolk powder | .8 |
| Mono-calcium phosphate | .2 |
| Salt | 1.0 |
| Wheat starch | 1.7 |
| Non-fat dried milk solids | 2.25 |

About 6 to 20 ounces of the chocolate chips to 1 pound of one of the above mixes is usually employed. Thus, in the case of Examples 14 and 15, about 3¼ ounces of chocolate chip to 10½ ounces of the respective mix is satisfactory for making a chocolate chip cookie. The chocolate chip constitutes about 23% on a weight basis of the mixture.

Example 15

Referring to Example 6, the mixture of 41.4% cocoa fat, 18.9% butterfat and 39.7% non-milk fat solids was adjusted with water to make a 40% solids mixture. This was pasteurized at 145° F. for 20 minutes and thereafter homogenized at this temperature and at 1000 p.s.i. and spray dried.

Example 15a

In this example the pasteurization was conducted for 20 minutes at 150° F. and the homogenization was at this temperature and at 1500 p.s.i.

In Examples 15 and 15a pasteurization was conducted at 145° F. to 150° F. for 20 minutes and homogenization was conducted at this temperature range and at 1000 p.s.i. to 1500 p.s.i., and in some cases there were two passages, one at 1000 p.s.i. and another at 1500 p.s.i.

Example 16

Alternatively, the cocoa fat in amount of 52%, milk fat in the amount of 15.7% and non-fat milk solids in the amount of 32.30% were similarly adjusted with water, homogenized and spray dried for use in connection with the various products described herein.

Example 17

Also, 34.9% chocolate liquor, 28.2% cocoa fat, 11.1% butterfat, and 25.9% non-fat milk solids were similarly adjusted with water, homogenized and spray dried.

Example 18

35.57% of the product of Example 16 was combined with 55% sugar and 9.43% 22% cocoa fat, and the same compressed under 4000 pounds p.s.i.

Example 19

29% of the product of Example 15 was mixed with 55% sugar and 16.0% chocolate liquor of 54% cocoa fat. The liquor and sugar were melted by heating the same with agitation and then chilled. The chilled product was mixed with the product of Example 15, and compressed, as described above.

Example 20

44.5% of the product of Example 17 was mixed with 46.5% sugar and 9% cocoa (low fat 4%) and compressed as described.

Example 21

Referring to Examples 5 and 6, all of the ingredients were adjusted with water to make a 40% solids mixture, pasteurized at 150° F. for 20 minutes, homogenized at 1000 or 1500 p.s.i. or both and spray dried. The spray dried powder was then cooled and passed whereby all ingredients were mixed initially and subsequently processed to form the chip, i.e., only one powder was formed containing all ingredients and there was not additional mixing.

The products described herein all meet the legal standards for chocolate and chocolate chip but as pointed out do not objectionably soften or melt as in a cookie mix at high temperatures, e.g., about 115° to 275° F., nor are the chips absorbed into the mix. This temperature range comprehends the temperatures normally encountered in storage and handling up to and including the baking temperatures of cookie and pastry mixes.

This application is a continuation-in-part of our application Serial No. 488,400, filed February 15, 1955, now abandoned.

We claim:

1. A process of preparing a compressed chocolate chip product, said process comprising melting sweet milk chocolate, withdrawing a portion of the melted chocolate and adding the same to water, homogenizing the mixture of the withdrawn chocolate and water and spray drying the same to form a powder, said powder having a core of milk fat and cocoa fat encased in a hull of milk and cocoa solids, adding said powder to the remaining melted chocolate and dispersing the same therein, holding the mass at the fat crystallization point and allowing the fat to crystallize slowly into very fine crystals, compressing the mass into sheets and thereafter chilling the sheets to harden and solidify the product.

2. The process according to claim 1 wherein the amount of melted chocolate which is withdrawn is about 40% by weight of the melted chocolate and when added to the water produces about a 40% solids mixture.

3. The process according to claim 1 wherein the mass prior to chilling is held at a fat crystallization point between about 84 to 88° F. for three to five hours.

4. The process according to claim 1 in which the amount of molten chocolate withdrawn and treated and returned as the powder to the main body of melted chocolate is in a ratio of between .5 part and 1.75 parts treated powdered to 1 part molten chocolate by weight.

5. The process according to claim 1 wherein the homogenization takes place at a pressure between 1,000 to 2,000 p.s.i. with the withdrawn mixture at a temperature of about 140° to 145°.

6. The process according to claim 1 wherein the chocolate liquor was enzymatically treated.

7. A compressed chocolate chip produced by the process of claim 1.

References Cited in the file of this patent

UNITED STATES PATENTS

| 1,854,354 | Wallerstein | Apr. 19, 1932 |
| 2,189,144 | Klewer | Feb. 6, 1940 |
| 2,201,820 | Zizinia | May 21, 1940 |